United States Patent
Sampson et al.

(10) Patent No.: US 6,339,423 B1
(45) Date of Patent: Jan. 15, 2002

(54) MULTI-DOMAIN ACCESS CONTROL

(75) Inventors: Lawrence Sampson, San Jose, CA (US); Emilio Belmonte, Seville (ES); Marco Fanti, Rockaway, NJ (US); Raul Medina, San Jose, CA (US)

(73) Assignee: Entrust, Inc., Plano, TX (US)

( * ) Notice: Subject to any disclaimer, the term of this patent is extended or adjusted under 35 U.S.C. 154(b) by 0 days.

(21) Appl. No.: 09/535,080

(22) Filed: Mar. 23, 2000

Related U.S. Application Data (60) Provisional application No. 60/150,392, filed on Oct. 23, 1999.

(51) Int. Cl.[7] ............................................. G06F 12/00
(52) U.S. Cl. ...................................... 345/357; 709/219
(58) Field of Search ................................ 709/217, 218, 709/219, 225; 713/200, 201; 345/331, 335, 356, 357

(56) References Cited

U.S. PATENT DOCUMENTS

| | | | |
|---|---|---|---|
| 5,012,515 A | | 4/1991 | McVitie ........................ 713/201 |
| 6,032,259 A | | 2/2000 | Nemoto ........................ 713/201 |
| 6,065,120 A | * | 5/2000 | Laursen et al. ............... 713/201 |
| 6,008,796 A | * | 7/2000 | Cianfrocca et al. .......... 713/152 |
| 6,092,203 A | * | 7/2000 | Ooki et al. .................... 713/201 |
| 6,145,084 A | * | 11/2000 | Zuili et al. ................... 713/201 |

* cited by examiner

Primary Examiner—Raymond J. Bayerl
Assistant Examiner—Cao H. Nguyen
(74) Attorney, Agent, or Firm—Hickman Palermo Truong & Becker LLP; Marcel K. Bingham (57) ABSTRACT

A multi-domain resource access control mechanism uses a single access control system to manage access by users to resources that belong to multiple domains. A server is associated with each domain in a set of domains. Access to resources in the domains is governed by an access control system. A first server for a first domain transmits a data token to a client seeking access to a resource in a second domain. The client transmits the data token to a second server in the other domain. The second server uses the data token to verify that the user is authentic, that is, authorized to access resources protected by the access control system. Once determining that the user is authorized to access resources, access control cookies are transmitted to client. When the client requests access to a resource in the second domain, and the request did not include access control cookies for the second domain, data is transmitted to the browser causing it to generate another request to the first server. The first server ensures that the user has been authenticated before transmitting the data token to the browser. In addition, the first server may cause copies of access control cookies for the user to be stored for later transmission to the second server.

28 Claims, 7 Drawing Sheets

MULTI-DOMAIN ACCESS CONTROL

RELATED APPLICATION

This patent application claims priority from U.S. Provisional Patent Application No. 60/150,392, filed on Oct. 23, 1999 Pending, entitled Multi-Domain Support in a Web Application Access System, which is hereby incorporated by reference in its entirety.

FIELD OF THE INVENTION

The present invention relates to managing access to resources accessible over a network.

BACKGROUND OF THE INVENTION

Computer networks have become ubiquitous in business, industry, and education. Networks have one or more resources, such as application programs that provide various computing functions, which are available to all users. Development of the globally accessible, packet-switched network known as the Internet has enabled network resources to become available worldwide. Development of the hypertext protocol ("HTTP") that implements the World Wide Web (the "web") enables networks to serve as a platform for global electronic commerce. In particular, through the web a business easily exchanges information with its customers, suppliers and partners worldwide. Because some exchanged information is valuable and sensitive, access to it should be limited to selected users. Thus, there is a need to provide selective access information available over the web.

One approach to solving the foregoing problem is to protect a set of resources accessible over the network with an access control mechanism. An access control mechanism is a combination of software and hardware configured to manage access to a set of resources connected to a network. Often, the access control mechanism is commercial software, which is purchased as off-the-shelf software from vendors of access control mechanisms. A resource is a source of information, identified by an identifier, such as a uniform resource locator ("URL") or an internet protocol ("IP") address. A resource protected by an access control system may be a static file ("page") containing code conforming to the Hypertext Markup Language ("HTML") or a dynamically generated page created by programs based on the Common Gateway Interface ("CGI"). Examples of resources include a web page, a complete web site, a web-enabled database, and an applet.

Figure 1:
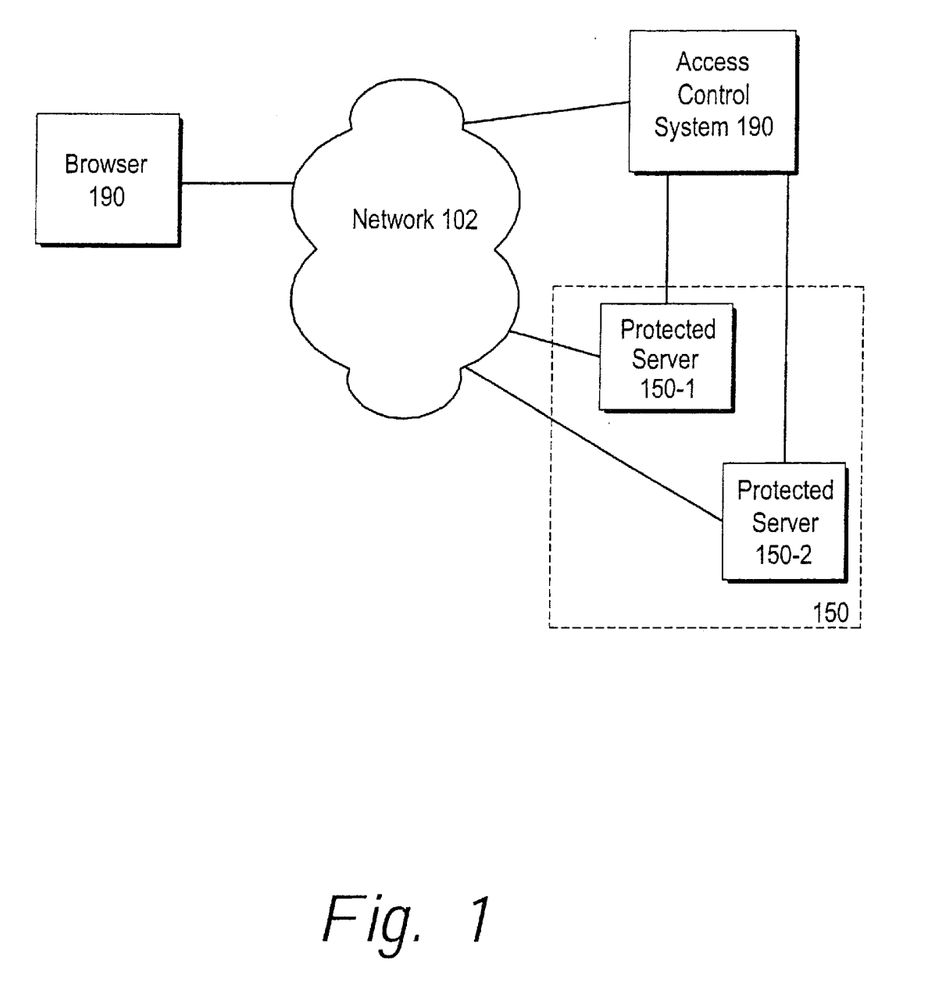
FIG. 1 is block diagram that depicts an exemplary network, resources coupled to the network, and an access control system used to manage access to the resources.

FIG. 1 is a block diagram that depicts an exemplary network architecture 100 that includes a system protected by an access control mechanism 101. Exemplary network architecture 100 includes a browser 110 coupled by a communication link to a network 102. The block shown for browser 110 represents a terminal, workstation computer, or an equivalent that executes a standard browser program or an equivalent, such as Netscape Navigator, Internet Explorer, or NCSA Mosaic. Network 102 is a compatible information communication network, preferably the Internet. In alternate embodiments, the browser 100 is a client process or client workstation of any convenient type, and the network 102 is a data communication network that can transfer information between the client and a server that is also coupled to the network.

The term server is used here to refer to one or more computer software or hardware elements which are dedicated to providing requested functions ("services") on behalf of clients that transmit requests. A server may be a software module which may be invoked by and executed by a client process, a separate process that receives requests from other client processes running the same computer system, or a set of processes running on a set of computers, where the processes respond to requests by clients running on other computers.

Access control system 190 is coupled to network 102 and supplies services used to manage access to protected servers 150, including user authentication and verification services, in a manner which shall be later described in greater detail. Protected servers 150 are also coupled to network 102 and supply one or more resources.

Before a user may access a resource from protected servers 150, the user must first log in to access control system 190, supplying information to access control system 190 used to authenticate the user. Users may log in either with a digital certificate transmitted to access control system 190 or by opening a login page supplied by access control system 190 with browser 110 and entering a name and password. Once the user is authenticated, an authenticated session is associated with the user, and the user may then access one or more resources on protected servers during the life of the authenticated session.

For this purpose, access control system 190 transmits one ore more identification data, e.g., cookies, to browser 110 that are used, at least in part, by a protected server to verify that the user has been authenticated. Cookies are pieces of information which a server may create and transmit to a browser, to cause the browser to store the cookie and retransmit it in subsequent requests to servers. A cookie may be associated with a domain name used to identify the IP address of a server. A domain name is an identifier that identifies a set or one or more IP addresses. Examples of domain names are 'enCommerce.com' or 'uspto.gov'. A browser transmits a cookie in conjunction with a request to the server to access a resource, transmitting the cookies as part of the request. The cookies transmitted are associated with the domain name of the server.

A domain name may be used in an address that identifies a resource, such as a URL. For example, a domain may be used to identify resources "sample1File.htm" and "sample2File.htm", by using the URL "www.demoDomain/sample2File.htm", where 'demoDomain' is the domain name. The domain name corresponds to the IP address of a server that may supply a resource.

A domain is a set of resources which may identified by the domain's name. Thus, 'sample1File.htm' sample2File.htm' are resources that belong to the same domain. The process of accessing a resource via a request that identifies the resource using a domain name is referred as accessing the domain.

When a protected server receives a request for access from a client who has been authenticated, the protected server receives "access control cookies" for the domain of the server. The access control cookies may contain information used to verify that a user has been authenticated, and may contain data that specifies the user's privileges. A privilege is a right to access a particular resource. Access control cookies are typically encrypted for security purposes.

A major drawback to a conventional access control system is that it only controls access to a set of servers and resources that belong to one domain. The underlying reason for this limitation is as follows. When a conventional access control system supplies access control cookies to a user that has just been authenticated, the cookies transmitted are associated with the domain of the access control system. When the browser requests access to another resource in another domain, the access control cookies are not transmitted because they are associated with the other domain. Thus, each domain name used to deploy a set of servers or resources requires its own implementation and maintenance of an access control system, adding to the expense of securing resources accessible over a network. In addition, for each domain name a user must login. Thus, the user may be encumbered by repetitious login procedures, or the number of domain names that may be used are limited by efforts to avoid encumbering the user.

Based on the foregoing, it is clearly desirable to provide an access control system that may be used to manage access to a set of resources deployed under multiple domain names, particular, requires a user to login just once to access the set of resources.

SUMMARY OF THE INVENTION

A mechanism that uses a single access control system to manage access by users to resources that belong to multiple domains is disclosed. According to one aspect, a server is associated with each domain in a set of domains. Access to resources in the domains is governed by an access control system. A first server for a first domain transmits a data token to a client seeking access to a resource in a second domain. The client transmits the data token to a second server in the other domain. The second server uses the data token to verify that the user is, authorized to access resources protected by the access control system. Once determining that the user is authorized to access resources, access control "cookies" are transmitted to client.

According to another aspect of the present invention, when the client requests access to a resource in the second domain, and the request did not include access control cookies for the second domain, data is transmitted to the browser causing it to generate another request to the first server. The first server ensures that the user has been authenticated before transmitting the data token to the browser. In addition, the first server may cause copies of access control cookies for the user to be stored for later transmission to the second server.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for multi-domain access control system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 2:
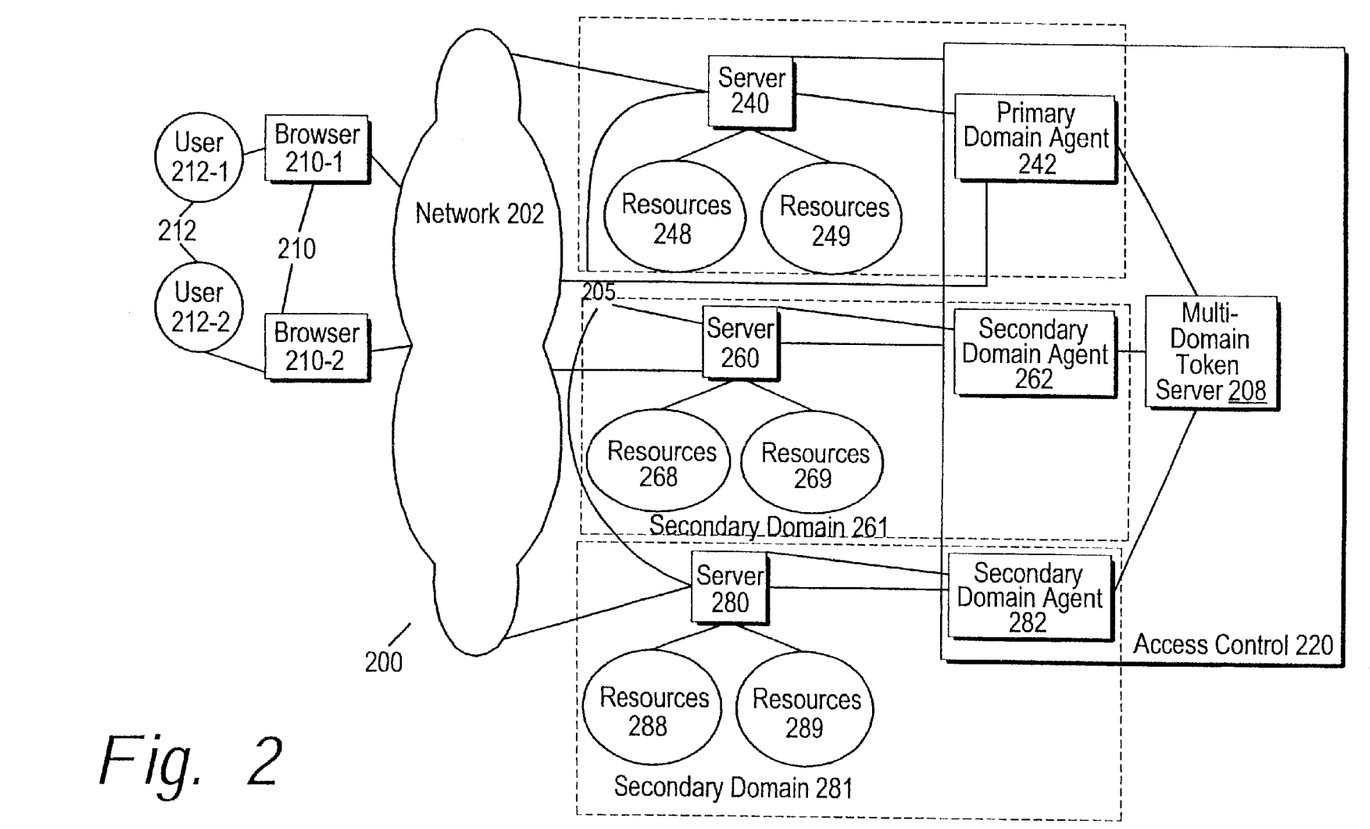
FIG. 2 is block diagram that depicts an exemplary network, resources coupled to the network, and an access control system used to manage access to the resources in multiple domains.

FIG. 2 is a block diagram that depicts exemplary network architecture 200, a architecture which incorporates a multi-domain access control system. A multi-domain access control system allows a user to access multiple domains but only requires the user to login once to gain the access. The domains protected by a multi-domain access control system are referred to herein as trusted domains with respect to the multi-domain access control system.

Exemplary network architecture 200 includes browsers 210, each of which are coupled by a communication link to a network 202. The blocks shown for browsers 210 may represent a terminal, workstation computer, or an equivalent that executes a standard Web browser program or an equivalent, such as Netscape Communicator or, Internet Explorer. Users 212 interact with browsers 210 to access resources via network 202. Network 102 is a compatible information communication network, preferably the Internet. In alternate embodiments, a browser 210 is a client process or client workstation of any convenient type, and the network 202 is a data communication network that can transfer information between the client and a server that is also coupled to the network.

Browsers 210 transmit requests for resources ("resource request") to protected servers 205, which transmit the requested resource so long as the user who initiates the request via a browser 210 has been authenticated by access control system 220. The requests may conform to, and be responded to, in a manner that conforms to HTTP. Protected servers 205, which include protected servers 240, 260, 280, may be Web servers. In determining who has been authenticated, protected servers 205 and resources made available by protected servers 205 may use one or more services of access control system 220.

Each of protected servers 205 may be addressed by a domain name. Thus, each of protected servers 205 and the resources that may be accessed through the servers belong to a domain. Protected Server 240 and resources 248 and 249 belong to Primary Domain 241, Protected Server 260 and resources 268 and 269 belong to Secondary Domain Agent 262, and Protected Server 280 and resources 288 and 289 belong to Secondary Domain 282. The domains depicted in FIG. 2 are labeled domain and secondary for reasons which shall be explained in greater detail.

To determine whether a user is authorized to access the resource, a protected server 205 uses access control cookies, transmitting information derived from them to access control system 220. The access control cookies may contain encrypted data which specify information used to verify that the user is authentic. The protected server 205 may derive information from the cookies, and then transmit a request to access control system 120 to verify whether the user is authorized, passing in the information derived from the cookies, as well as the resource requested. Next, access control system 120 responds by transmitting back a message specifying whether or not the user is authorized to access the resource or any other resource.

COMPONENTS TO PROVIDE MULTI-DOMAIN ACCESS

To provide multi-domain access, access control information is created and stored. When a user is first authenticated, a browser receives a set of access control cookies associated with a particular domain from which cookies are transmitted. Subsequently, the user may request access to another domain protected by access control system 220. Therefore, when the browser transmits the request to a web server belonging to the other domain, access control cookies for the user are not transmitted. A mechanism verifies whether a user has been authenticated without having to receive access control cookies or causing the user to log-in again.

Such a mechanism is provided by the following components of access control system 220: Primary Domain Agent 242, Secondary Domain Agents 262 and 282, and Multi-Domain Token Server 208. These elements may be servers that cooperate with each other to provide a multi-domain access control system, using a variety techniques which shall be later described in greater detail.

While each technique is different, there are aspects of the roles played in each by a component that remain the same. Further, different components, or fewer components, that carry out the same roles, are equivalent and can be used. It is therefore useful to describe the role each component plays by providing an overview of a multi-domain process, as follows.

Generally, in one embodiment, when a browser transmits a request to a protected server on behalf of a user to access a resource in a domain, and the browser does not transmit any access control cookies for the domain, the browser is connected to the secondary domain agent belonging to the domain. The secondary domain agent causes the browser to connect to the Primary Domain Agent 242. If the user has been authenticated, then Primary Domain Agent 242 transmits to Multi-Domain Token Server 208 a request for a "Multi-Domain Token." A Multi-Domain Token is an encrypted data item used to verify that the user has been authenticated by Access Control System 220, and shall be explained in greater detail. Multi-Domain Token Server 208 generates a Multi-Domain Token and supplies it to the Primary Domain Agent 242.

The Primary Domain Agent 242 transmits the Multi-Doman Token to the browser, and causes the browser to connect to the Secondary Domain Agent. When the browser connects to the Secondary Domain Agent, the browser transmits a Multi-Domain Token to the Secondary Domain Agent. The Secondary Domain Agent then transmits to Multi-Domain Token Server 208 a request to verify that the Multi-Domain Token represents a user that has been authenticated by access control system 220. Upon receiving from Multi-Domain Token Server 208 a message confirming that the user has been authenticated, the Secondary Domain Agent transmits to the browser access control cookies that are associated with the domain of the Secondary Domain Agent.

Multi-Domain Token Server 208 includes various API functions to support multi-domain control. These include functions to create a Multi-Domain Token, verify a Multi-Domain Token, store and get data for access control cookies associated with a particular domain, and adding a trusted domain. A list of the trusted domains is maintained by Multi-Domain Token Server 208.

Multi-Domain Token Server 208 verifies that a Multi-Domain Token was issued from Multi-Domain Token Server 208 through the use of encryption technology. Because Multi-Domain Tokens are issued only for authenticated users, a browser that presents a Multi-Domain Token may be assumed to have been authenticated.

In one preferred embodiment, the size of a Multi-Domain Token Server 208 is made small enough so that it may be transported as part of the URL string in an HTTP request. The URL string is data transmitted as part of a resource request, and is transmitted regardless of the domain to which access is requested. The URL string contains data specifying the URL, and may contain other data, such as parameters in the form of name-value pairs. The amount of data that may be included in a URL string is limited. Because the URL string is always transmitted in a resource request, when a Multi-Domain Token is included in a URL string, it will be transmitted. If the Multi-Domain Token were included in a cookie, it would only be transported in a request for access to the domain associated with the cookie.

In one embodiment, protected servers 205 and access control system 220 are stored on and executed by one physical server or computer. In alternate embodiments, one or more these components are distributed on separate computers; this approach may improve security and performance. For example, each of protected servers 205 may be installed on or executed by separate computers. Primary Domain Agent 242 and Secondary Domain Agents 262 and 282 may be installed on the same computer as protected servers 240, 260, 280 respectively. Each of protected servers 205 and Secondary Domain Agent and various other components of Access controller 220 may be located on an extranet for access by external users. Multi-Domain Token Server 208 may be coupled to a secure Intranet that is protected using a firewall.

In order for a Secondary Domain Agent to perform its role, it must be accessible to users for whom authenticated access control cookies cannot be provided. Accordingly, Secondary Domain Agents 262 and 282 are not protected by access control system 120. On the other hand, Primary Domain Agent 242 is inherently protected. Because it is protected, any browser attempting to access Primary Domain Agent 242 must transmit access control cookies which show that the user is authentic. If the browser does not present such access control cookies, they may be obtained by performing log-in procedures.

Primary Domain Agent 242, Secondary Domain Agents 262 and 282, and Multi-Domain Token Server 208 may be implemented using a variety software technologies. For example, Primary Domain Agent 242, Secondary Domain Agents 262 and 282 may be written as CGI scripts, Netscape Server API, Internet Server API plug ins. Multi-Domain Token Server 208 may be written using software used to generate CORBA compliant modules and objects.

MULTI-DOMAIN ACCESS CONTROL

FIG. 3A, FIG. 3B, FIG. 4A, and FIG. 4B are flowcharts that depict, in part, one embodiment of a process for implementing a multi-domain access control system. The steps are illustrated using exemplary network architecture 200 in FIG. 2. In the illustration, the clients communicate using the HTTP protocol. However, any version of HTTP, or any other suitable communication protocol may be used.

Figure 3A:
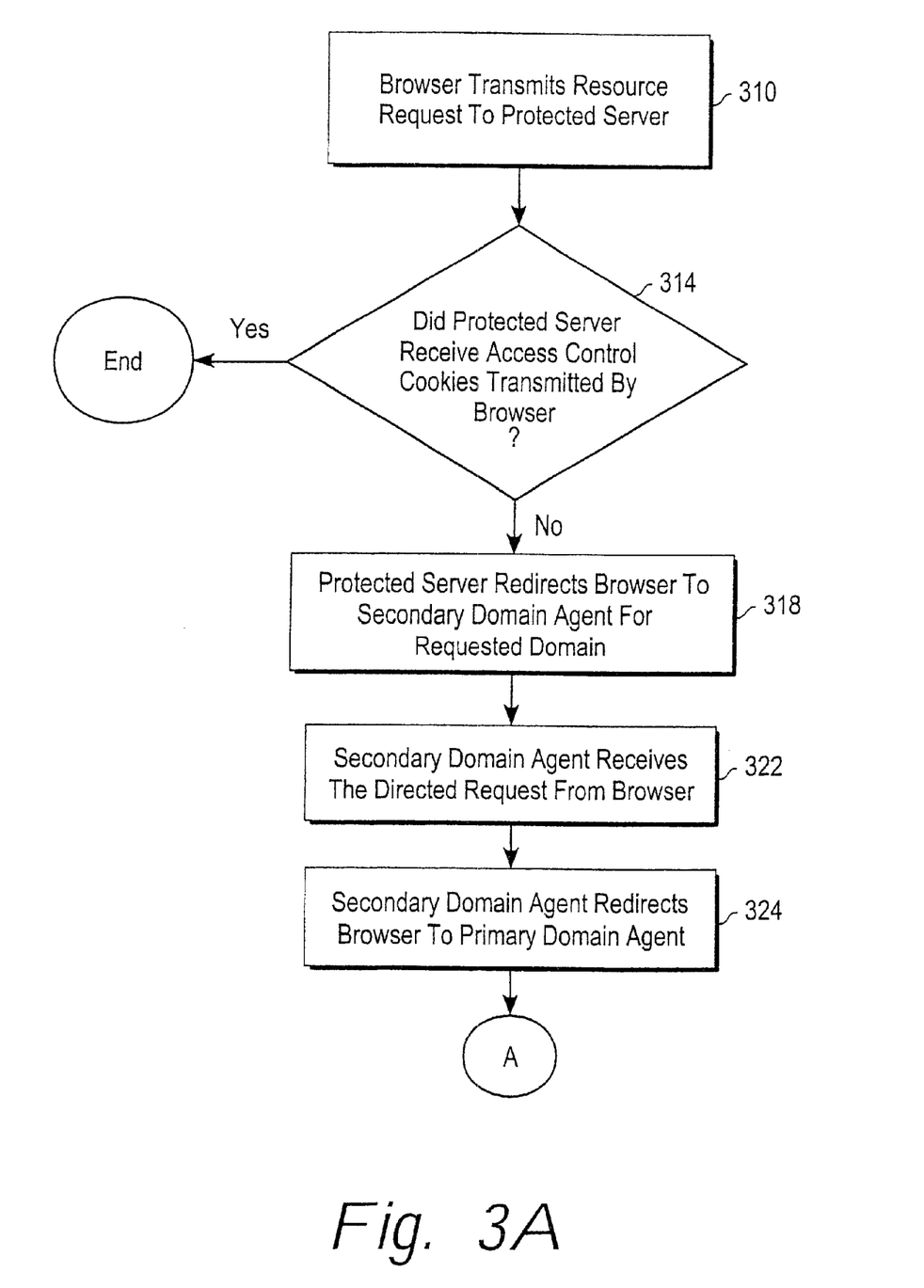
FIG. 3A is a flow chart that depicts a process used to manage access to resources in multiple domains.

Referring to FIG. 3A, at step 310, browser 210-1 transmits a resource request to protected server 260 for resource 268, a protected resource. A protected resource is a resource that may only be accessed by users authenticated by access control system 220. In transmitting the resource request, browser 210-1 did not transmit any access control cookies for the domain of resource 268, that is, secondary domain 261, which is herein referred to as the requested domain.

Figure 3B:
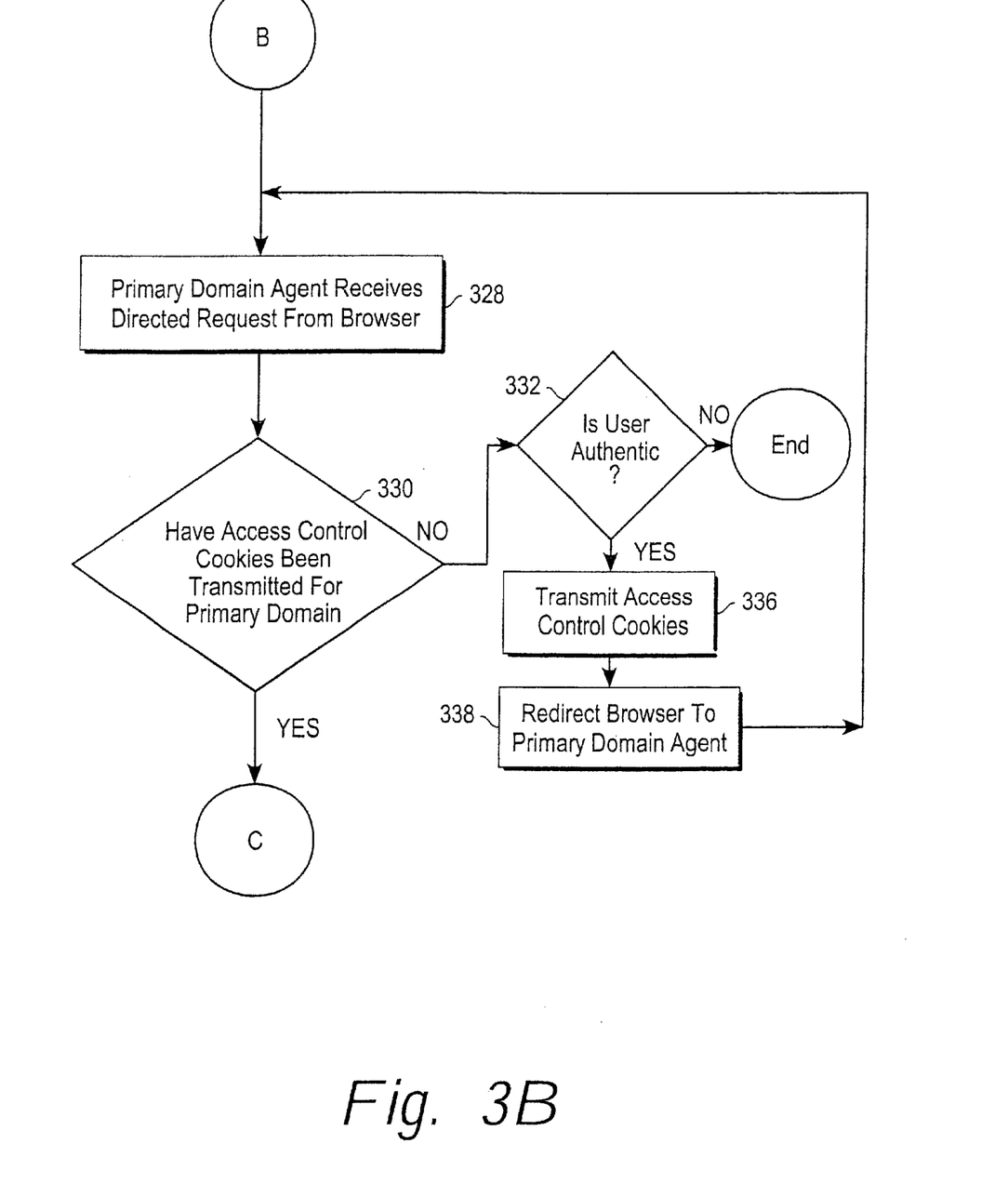
FIG. 3B is a flow chart that depicts a process used to manage access to resources in multiple domains.

At step 314, protected server 260 determines whether or not access control cookies for the requested domain were transmitted to protected server 260 as part of the resource request transmitted in step 310. If access control cookies were received, then the steps shown in FIG. 3A end. When the steps in FIGS. 3A–4B are described as ending, alternatively, further processing may occur. This processing can include, for example, operations for verifying that the access control cookies represent an authentic user and providing access to the requested resource, or operations for denying access to the requested resource. The additional processing that occurs may depend on where in the process depicted in FIG. 3–FIG. 4B the steps end.

If on the other hand, at step 314, protected server 260 determines that access control cookies for the requested domain have not been transmitted, then execution proceeds to step 318.

At step 318, the protected server 260 redirects the browser 210-1 to a Secondary Domain Agent, e.g., Secondary Domain Agent 262. The term redirect refers to transmitting a redirection to a browser, which is data that causes the browser to generate another request to access another resource specified in the redirection. The redirection may specify parameters and parameter values to pass along in a directed request to the other resource. For example, redirection may be accomplished by transmitting a page with an HTML redirection tag. The tag includes data that specifies the URL of Secondary Domain Agent 262. The tag may also include parameter values in the form of, for example, name value pairs that are passed with the directed request.

At step 322, Secondary Domain Agent 262 receives the directed request from browser 210-1. In response, at step 324, the Secondary Domain Agent redirects browser 210-1 to Primary Domain Agent 242. The redirection specifies parameter values to pass as part of the directed request to Primary Domain Agent 242. In one preferred embodiment, these parameters are herein referred to as ORIGINATING_ SDA, and may include the following.

1. The originally requested resource.
2. The requested domain, that is, the domain of the originally requested resource.
3. The Secondary Domain Agent.

The parameters may comprise identifying information, e.g., URLs or I.P. addresses.

Referring to FIG. 3B., at step 328, the Primary Domain Agent 242 receives the directed request initiated at step 324.

At step 330, the Primary Domain Agent 242 determines whether access control cookies for its domain have been transmitted with the directed request received at step 328. If not, then control passes to step 332, where it is determined whether the user is authentic. The step may include various processes for authenticating users, including user/password authentication, or use of digital certificates. If the user is not authentic, then execution of the steps ends. Otherwise, control flows to step 336, where access control cookies for the domain of Primary Domain Agent 242, domain 241, are transmitted to browser 210-1. At step 338, the browser is redirected to the Primary Domain Agent 242. At step 328, the Primary Domain Agent 242 receives the directed request, which includes the access control cookies. At step 330, the Primary Domain Agent 242 determines that access control cookies for its domain have been transmitted as part of the directed request.

Figure 4A:
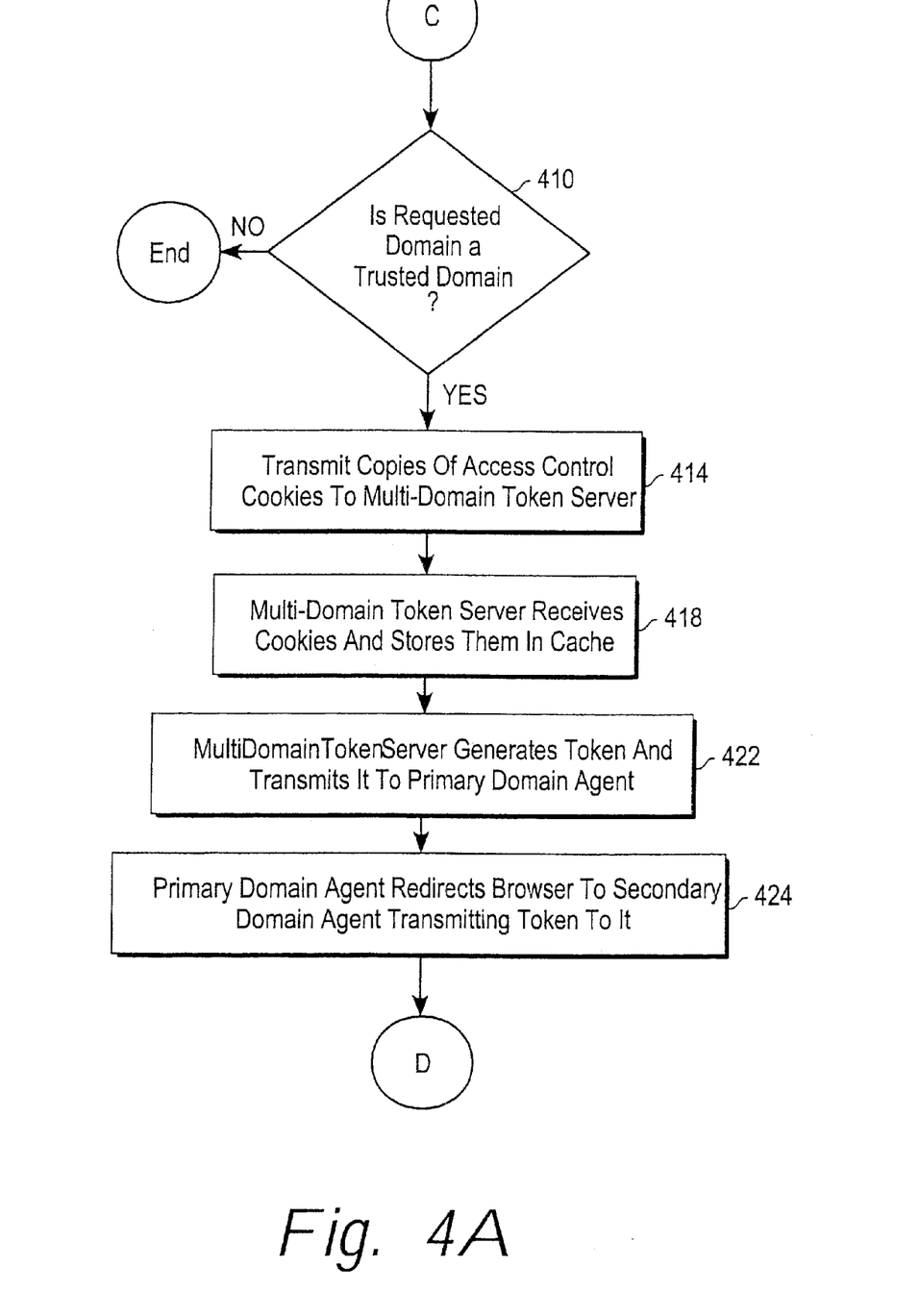
FIG. 4A is a flow chart that depicts a process used to manage access to resources in multiple domains.

Referring to FIG. 4A, at step 410, Primary Domain Agent 242 determines whether or not the requested domain, as specified in ORIGINATING_SMDA, is a trusted domain. To perform this determination, Primary Domain Agent 242 may invoke an API function of the Multi-Domain Token Server 208. If Primary Domain Agent 242 determines that the requested domain is not a trusted domain, then execution of the steps ends. Otherwise, execution of the steps proceeds to step 414.

At step 414, the Primary Domain Agent 242 transmits copies of the access control cookies received at step 328 to the Multi-Domain Token Server 208.

At step 418, Multi-Domain Token Server 208 receives the cookies and stores them in cache. They may be stored here for a configurable period of time.

At step 422, the Multi-Domain Token Server 208 generates a Multi-Domain Token and transmits it to Primary Domain Agent 242. The Multi-Domain Token may have a variety of data elements. For example, it may include (1) data that identifies the copy of the cookies stored in the Multi-Domain Token Server 208 as step 418 ("Cookie Set ID"), (2) the original URL of the originally requested resource, and (3) a hash value based on the two previous elements. A Multi-Domain Token is not limited to containing any particular set of data elements other equivalent information may be used.

At step 424, Primary Domain Agent 242 redirects browser 210-1 to Secondary Domain Agent 262, transmitting the Multi-Domain Token.

Figure 4B:
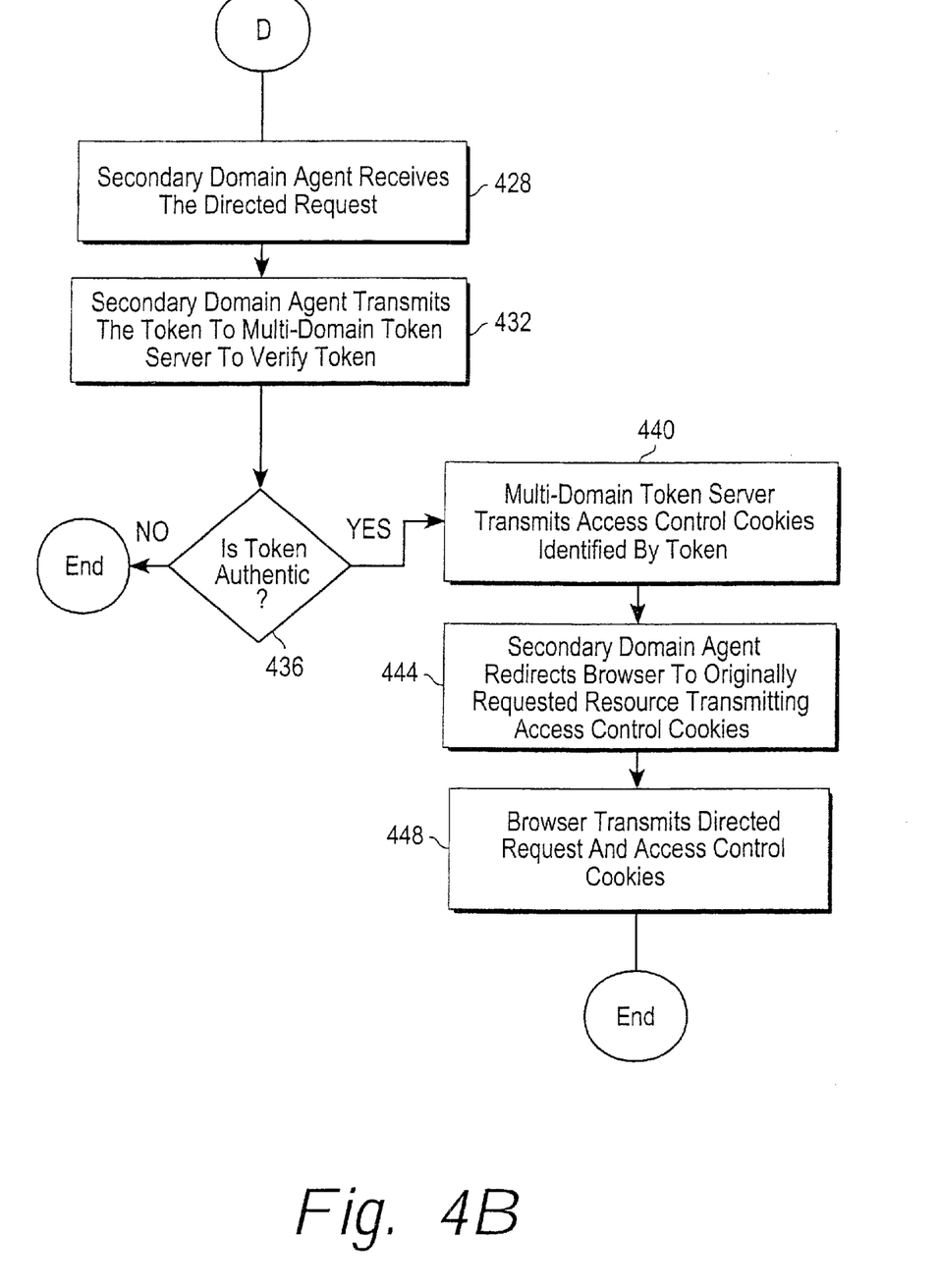
FIG. 4B is a flow chart that depicts a process used to manage access to resources in multiple domains.

Referring to FIG. 4B, at step 428, Secondary Domain Agent 262 receives the directed request, including the Multi-Domain Token.

At step 432, to verify the Multi-Domain Token, the Secondary Domain Agent 262 transmits the Multi-Domain Token to Multi-Domain Token Server 208.

At step 436, the Multi-Domain Token Server 208 determines whether or not the Multi-Domain Token is authentic, that is, whether it had been issued by a Multi-Domain Token Server 208 server for an authentic user. The process of making this determination involves decrypting the token. If the Multi-Domain Token is not authentic, then execution of the steps ends. Otherwise, control flows to step 440.

At step 440, the previously stored access control cookies, which are identified by Cookie_Set_Id, are transmitted to the Secondary Domain Agent. It is no longer necessary to cache the access control cookies. At step 444, the Secondary Domain Agent 262 redirects browser 210-1 to the originally requested resource, transmitting the access control cookies to browser 210- 1.

At step 448, browser 210-1 transmits the directed request, requesting the originally requested resource. As a result of the browser receiving access controls cookies transmitted to it by the secondary domain agent 262 at step 444, the redirection request transmitted by browser 210-1 includes access control cookies. Consequently, browser 210-1 may access the originally requested resource, assuming the access control cookies specify sufficient privileges.

ALTERNATE MULTI-DOMAIN ACCESS CONTROL

At step 414, Primary Domain Agent 242 transmits copies of the access control cookies received at step 328 to the Multi-Domain Token Server 208, causing the Multi-Domain Token Server 208 to store the access control cookies in cache until they are later requested by a Secondary Domain Agent. Rather then transporting the access control cookies to the Secondary Domain Agent in this manner, they may be transported via the Multi-Domain Token. Of course the Multi-Domain Token is limited in size, and is not capable of holding the amount of data that may be stored in the cookie and that may be needed for access control privileges.

After browser 210-1 receives access control cookies via a Secondary Domain Agent 260, browser 210-1 may request a resource in another trusted domain. If the browser is not storing access control cookies for this domain, then no access control cookies will be transmitted with the request to access the resource in the other trusted domain. Consequently, the steps shown in FIG. 3A and FIG. 4B are re-executed, and these steps may become a cycle that is repeated each time another trusted domain is accessed.

Repetition of the steps shown in FIGS. 3A–4B may be avoided by modifying the depicted process as follows. At step 444, rather than redirecting the browser to the originally requested resource, the Secondary Domain Agent redirects the browser to another Secondary Domain Agent, transmitting the Multi-Domain Token with the redirection request. After verifying the Multi-Domain Token, the other Secondary Domain Agent redirects the browser to yet another Secondary Domain Agent in another trusted domain, transmitting access control cookies to the browser and the Multi-Domain Token to the browser. This process repeats until the browser receives access control cookies for all the trusted domains, at which point the browser is redirected to the originally requested resource.

For purposes of efficiency and failure handling, it may be desirable to execute replicas of Multi-Domain Token Servers. The access control cookies could be replicated in each Multi-Domain Token Server replica. Thus, when a Multi-Domain Token Server receives a request to store access control cookies, it stores and communicates them to the other Multi-Domain Token Server replicas. Consequently, for the purposes of retrieving access control cookies, a secondary Domain Agent may request a copy of a set of access control cookies from any replica.

To avoid replicating access control cookies in all replicas of a Multi-Domain Token Server, a set of access control cookies for a user would only be stored in one replica. Specifically, in response to a request to store copies of access control cookies, a Multi-Domain Token Server replica generates a Multi-Domain Token that includes a Replica Id that identifies the Multi-Domain Token Server. A Secondary Domain Agent requests access control cookies from the Multi-Domain Server identified by a Multi-Domain Token.

If a replica fails, a Secondary Domain Agent redirects browsers that present a Multi-Domain Token identifying the failed Multi-Domain Token Server 208 to the Primary Domain Agent 242. This redirection may eventually lead to generating and storing another set of access control cookies in an operating Multi-Domain Token Server replica, and the generating another Multi-Domain Token that identifies the operating Multi-Domain Token Server.

HARDWARE OVERVIEW

Figure 5:
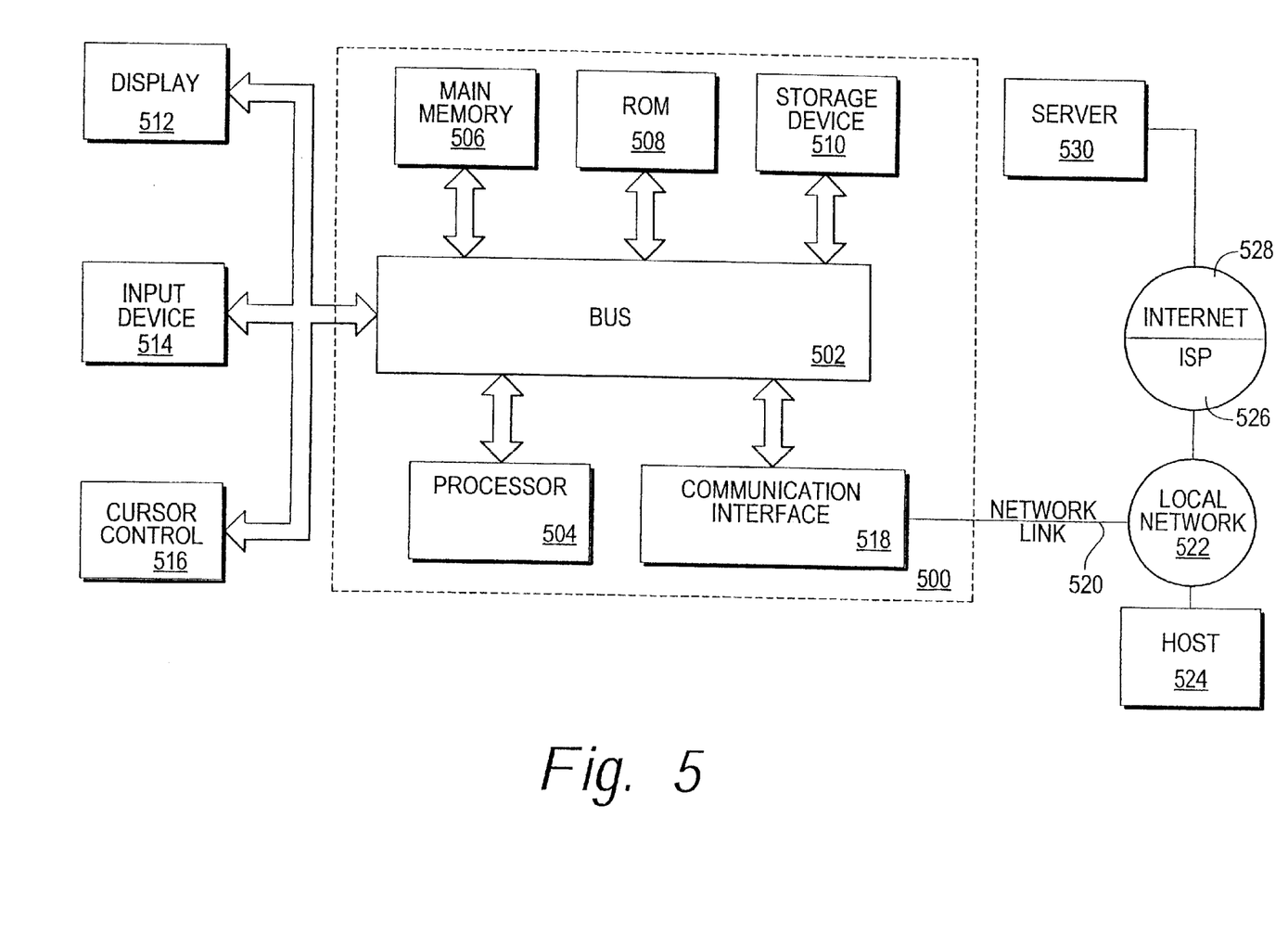
FIG. 5 is a block diagram of a computer system that may be used to implement an embodiment.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are implemented by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application implements the techniques described herein.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. For example, the techniques described herein for multi-domain access have been illustrated using cookies. However, the techniques are applicable to any data item whose transportation between a client and servers is restricted to and from servers that belong to the same domain, or to some class or group of servers. Therefore, the specification and drawings are, accordingly, to be regarded in an illustrative rather than a restrictive sense.

What is claimed is:

1. A method of controlling access to a resource protected by an access control system that uses access control information transmitted in conjunction with requests to access the resource to determine whether access may be permitted, the method comprising the steps of:

a first server receiving a particular data item from a client, wherein said first server transmits and receives access control information generated by said access control system in first data items that are only transmitted between a first class of one or more servers and said client, wherein said particular data item:

was transmitted to said client from a second server that does not belong to said first class, and indicates that a user has been authenticated by said access control system;

said first server determining that said user has been authenticated by said access control system based on said particular data item; and in response to said first server determining that said user may access said resource, transmitting access control information in a first data item of said first data items.

2. The method of claim 1, further including the steps of:

receiving a first request from said client to access said resource;

determining that said client did not transmit particular access control information in conjunction with said first request that may be used to determine whether said client may access said resource; and in response to determining that said client did not transmit said particular access control information in conjunction with said first request, said first server causing said client to transmit a second request to said second server to determine access rights of said client.

3. The method of claim 2, wherein said particular data item was transmitted to said client from a second server in response to said second server determining that said user has been authenticated.

4. The method of claim 3, wherein said second server determining that said user has been authenticated includes said second server causing said user to log-in to said access control system to be authenticated by said access control system.

5. The method of claim 3, wherein said second server determining that said user has been authenticated includes said second server determining that said user has been authenticated by said access control system.

6. The method of claim 5, wherein said second server determining that said user has been authenticated by said access control system is performed by examining one or more cookies that are associated with a domain name associated with said second server but not said first server.

7. The method of claim 1, further including the steps of:

causing said client to transmit said particular data item to one or more other servers, wherein each other server of said one or more other servers transmits other data items that are only transmitted between said client and another class of one or more servers to which said each other server belongs; and each other server of said one or more other servers transmitting other access control information generated by said access control system in another data item of said respective other data items.

8. The method of claim 1, the method further including the steps of:

said second server causing a second data item which reflects said access control information in said first data item to be stored in a storage mechanism that may be accessed by said first server; and said first server retrieving said second data item to generate said first data item.

9. The method of claim 8, wherein said storage mechanism is a particular server dedicated to generating data items that each indicate that a particular user has been authenticated by said access control system, the method further including the step of said particular server generating said particular data item in response to a request transmitted by said second server to said particular server.

10. The method of claim 1, further including the steps of:

said second server transmitting a request for said particular data item to a particular server dedicated to generating data items that each indicate that a particular user has been authenticated by said access control system; and said particular server generating said particular data item and transmitting said particular data item to said second server.

11. The method of claim 10, wherein the step of said first server determining that said user has been authenticated by said access control system includes said first server transmitting a request to said particular server to verify that said particular data item is associated with a user that has been authenticated.

12. The method of claim 1, wherein said first class of servers are servers that belong to the same particular domain.

13. The method of claim 12, wherein said second server belongs a second domain and not said particular domain.

14. The method of claim 1, wherein said first data items are cookies.

15. A computer-readable medium carrying one or more sequences of one or more instructions for controlling access to a resource protected by an access control system that uses access control information transmitted in conjunction with requests to access the resource to determine whether access may be permitted, the one or more sequences of one or more instructions including instructions which when executed by one or more processors, cause the one or more processors to perform the steps of:

a first server receiving a particular data item from a client, wherein said first server transmits and receives access control information generated by said access control system in first data items that are only transmitted between a first class of one or more servers and said client, wherein said particular data item:

was transmitted to said client from a second server that does not belong to said first class, and indicates that a user has been authenticated by said access control system;

said first server determining that said user has been authenticated by said access control system based on said particular data item; and in response to said first server determining that said user may access said resource, transmitting access control information in a first data item of said first data items.

16. The computer-readable medium of claim 15, further including the steps of:

receiving a first request from said client to access said resource;

determining that said client did not transmit particular access control information in conjunction with said first request that may be used to determine whether said client may access said resource; and in response to determining that said client did not transmit said particular access control information in conjunction with said first request, said first server causing said client to transmit a second request to said second server to determine access rights of said client.

17. The computer-readable medium of claim 16, wherein said particular data item was transmitted to said client from a second server in response to said second server determining that said user has been authenticated.

18. The computer-readable medium of claim 17, wherein said second server determining that said user has been authenticated includes said second server causing said user to log-in to said access control system to be authenticated by said access control system.

19. The computer-readable medium of claim 17, wherein said second server determining that said user has been authenticated includes said second server determining that said user has been authenticated by said access control system.

20. The computer-readable medium of claim 19, wherein said second server determining that said user has been authenticated by said access control system is performed by examining one or more cookies that are associated with a domain name associated with said second server but not said first server.

21. A method of controlling access to a resource protected by an access control system that uses access control information transmitted in cookies to determine whether access may be permitted, the method comprising the steps of:

a first server receiving a particular data item from a client, wherein said first server transmits and receives access control information generated by said access control system in cookies associated with a first domain;

wherein said first server belongs to said first domain;

wherein said particular data item:

was transmitted to said client from a second server that does not belong to said first domain, and indicates that a user has been authenticated by said access control system;

said first server determining that said user has been authenticated by said access control system based on said particular data item; and in response to said first server determining that said user may access said resource, transmitting access control information in a cookie associated with the first domain to said client.

22. The method of claim 21, further including the steps of:

receiving a first request from said client to access said resource;

determining that said client did not transmit particular access control information in conjunction with said first request that may be used to determine whether said client may access said resource; and in response to determining that said client did not transmit said particular access control information in conjunction with said first request, said first server causing said client to transmit a second request to said second server to determine access rights of said client.

23. The method of claim 22, wherein said particular data item was transmitted to said client from a second server in response to said second server determining that said user has been authenticated.

24. A method of controlling access to a resource protected by an access control system that uses access control information transmitted in conjunction with requests to access the resource to determine whether access may be permitted, the method comprising the steps of:

a first server receiving a particular data item from a client, wherein said first server transmits and receives access control information generated by said access control system in first data items that are only transmitted by said client to one or more servers belonging to a first class of one or more servers, wherein said particular data item:
  was transmitted to said client from a second server that does not belong to said first class, and
  indicates that a user has been authenticated by said access control system;
said first server determining that said user has been authenticated by said access control system based on said particular data item; and
in response to said first server determining that said user may access said resource, transmitting access control information in a first data item of said first data items to said client.

25. The method of claim 24, further including the steps of:
receiving a first request from said client to access said resource;
  determining that said client did not transmit particular access control information in conjunction with said first request that may be used to determine whether said client may access said resource; and
  in response to determining that said client did not transmit said particular access control information in conjunction with said first request, said first server causing said client to transmit a second request to said second server to determine access rights of said client.

26. The method of claim 25, wherein said particular data item was transmitted to said client from a second server in response to said second server determining that said user has been authenticated.

27. The method of claim 25, wherein said client is a browser.

28. The method of claim 25, wherein said first data items are cookies.

* * * * *